Aug. 19, 1924.  1,505,312
C. CHISHOLM
CLUTCH
Filed Oct. 22, 1920    2 Sheets-Sheet 1
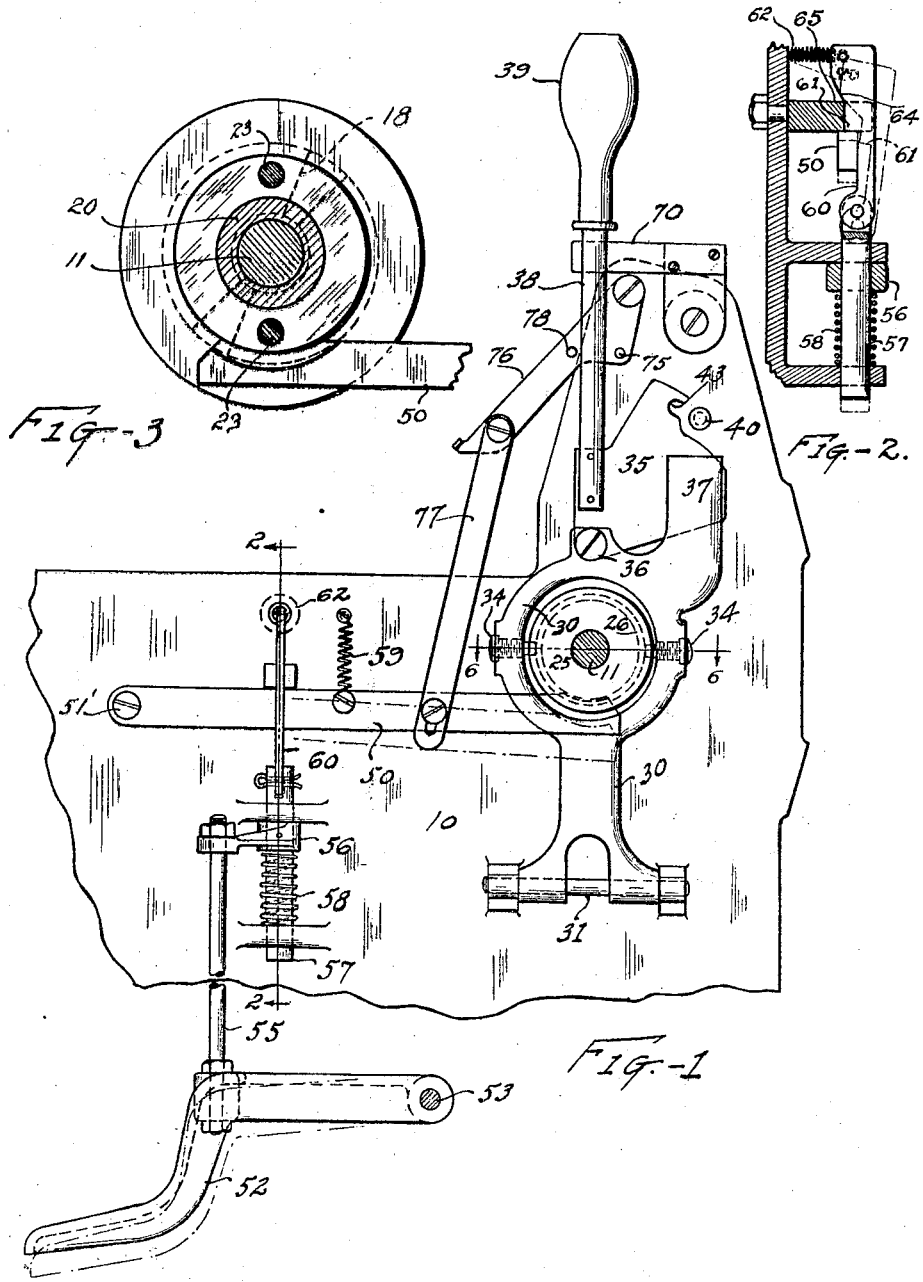

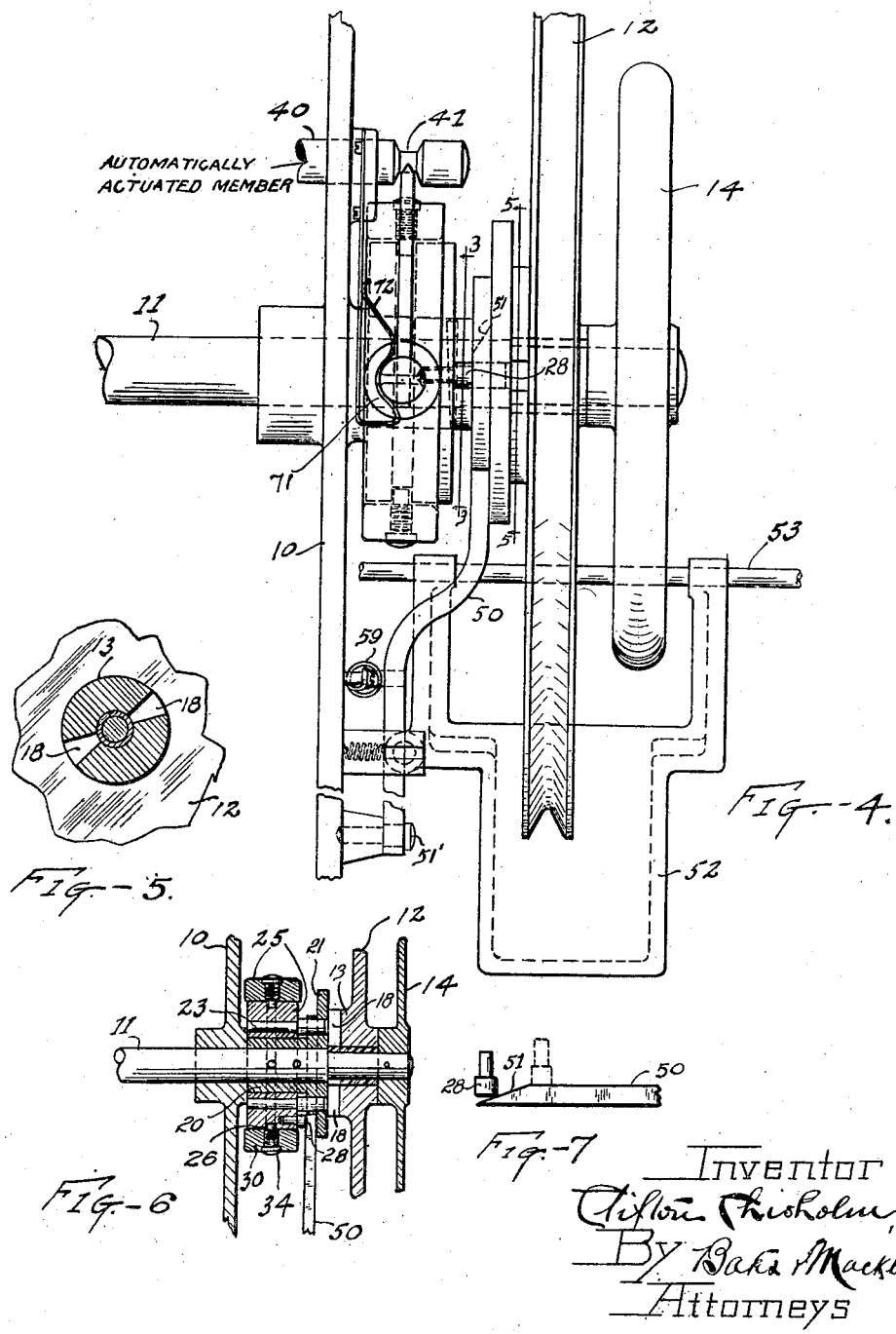

Patented Aug. 19, 1924.

1,505,312

UNITED STATES PATENT OFFICE.

CLIFTON CHISHOLM, OF CLEVELAND, OHIO, ASSIGNOR TO THE AMERICAN MULTI-GRAPH COMPANY, OF CLEVELAND, OHIO, A CORPORATION OF OHIO.

CLUTCH.

Application filed October 22, 1920. Serial No. 418,761.

*To all whom it may concern:*

Be it known that I, CLIFTON CHISHOLM, a citizen of the United States, residing at Cleveland, in the county of Cuyahoga and State of Ohio, have invented certain new and useful Improvements in Clutches, of which the following is a full, clear, and exact description, reference being had to the accompanying drawings.

This invention relates to clutch mechanism for various machines where it is desired to have the clutch automatically disengaged upon some contingency arising, or manually disengaged at the will of the operator. An instance where such a clutch is desirable is address printing machines, where the clutch should automatically become disengaged on failure of automatically fed paper to arrive at the printing position, and where it is also desirable, in case of hand-fed paper, to give the machine successive operations under the manual control of the operator.

The clutch, shown in the accompanying drawings has been devised to accomplish the above mentioned results effectively and by a small amount of mechanism. Such an embodiment of the invention will be hereinafter more fully described, and the essential novel characteristics, illustrated thereby, will be summarized in the claims.

In the drawings, Fig. 1 is an end view of my clutch and associated mechanism; Fig. 2 is a detail in cross section as indicated by the line 2—2 in Fig. 1, showing the trigger mechanism of the manual control; Fig. 3 is a cross section on an enlarged scale, as indicated by the line 3—3 in Fig. 4, this view being parallel with Fig. 1 but looking from the opposite direction; Fig. 4 is a plan of the clutch and associated mechanism; Fig. 5 is a detail in vertical section on the line 5—5 of Fig. 4, but on a smaller scale; Fig. 6 is a cross section on the plane indicated on the line 6—6 in Fig. 1; Fig. 7 is a view of the end portion of the manually operated disengaging member.

In the drawings, 10 indicates a suitable vertical frame plate of the machine; 11, the shaft to be driven under the control of the clutch; 12, a driving pulley loose on the shaft and adapted to be clutched to it by the mechanism of this invention. 14 indicates a hand wheel on the shaft for turning it by hand independently of the clutch; 20 in Figs. 1, 4 and 6 indicates a collar pinned, or otherwise secured, to the shaft 11, and having a flange 21 alongside of the hub 13 of the pulley 12. Slidably mounted in the flange 21 are pins 23, which have reduced end portions, rigidly secured in a shiftable collar 25, which is slidably mounted on the hub portion of the collar 20. These pins are adapted to clear the hub 13, allowing free rotatation of the driving pulley 12, or to be projected into recesses 18 in such hub and thereby lock the pulley to the shaft. Such shifting of the pins may be effected by a shifter lever 30, which is shown as pivoted at 31 to the frame plate 10, and having pins 34 engaging a peripheral groove 26 in the collar 25.

To operate the clutch automatically I provide a longitudinally shiftable rod 40, which may be moved by mechanism, not shown, toward the left in Fig. 4, whenever a contingency arises where it is desired to throw the clutch out of engagement. This rod has a peripheral groove 41 into which may extend a member connected with the shifter lever 30. As shown, this member is a plate 35 pivoted at 36 to the lever 30 and guided in a fork 37 of that lever. Secured to this plate is a rod 38, having a handle 39. The handle 39 may thus be swung about the clutch lever pin 31, to engage and disengage the clutch and may also be swung about the pivot screw 36 in a transverse direction to the direction of movement of the clutch lever.

Fig. 1 shows the automatic connection idle, but if the handle 39, there shown, is swung a slight distance toward the right the notched portion 43 of the plate 35 will engage the notch 41, thus placing the shifter lever under the control of the automatically shifted rod 40. Such mechanism enables the clutch to remain engaged for continuous operation until some contingency arises, causing its disengagement. At any time desired it may be manually disengaged by withdrawing the hook 43 from the automatic rod by means of the handle 39.

In several types of machines, when operated under manual control, it is desirable that the shaft shall make only one rotation upon each release. In addressing machines, for instance, where envelopes are fed by hand, it is desirable to release the machine for operation coincident with the feeding of envelopes and having the operation stopped until a new envelope is presented, the operator thus initiating each rotation in proper time with reference to the feeding of the envelopes. My mechanism provides for this operation, as will now be described.

Suitably pivoted at 51' to the frame of the machine is a controlling lever 50, having an inclined cam edge 51 adapted to stand in the path of a pin 28 on the collar 25 and force this collar away from the pulley, thus withdrawing the clutch pins from the pulley hub. This lever may be drawn into idle position (indicated by broken lines in Fig. 1) by a foot pedal 52, pivoted at 53 to some suitable support and having a rod 55 connected to an arm 56 on a sliding rod 57, which is connected with a trigger mechanism adapted to engage the lever 50. The rod 57 is vertically slidable in suitable brackets, carried by the frame 10, and is pressed upwardly by a spring 58.

The trigger mechanism shown consists of the bar 60 pivoted to the upper end of the rod 57 and carrying a projection 61 adapted to engage the upper edge of the lever 50, a spring 62 urging the arm 60 in this engaging direction. When the depression of the pedal 52 draws the trigger mechanism downward, a shoulder 64 thereon (Fig. 2) engages a cam projection 65 on the frame 10 and pulls the projection 61 out of engagement with the lever 50, whereupon the spring 59 raises the lever 50 to active position.

It results from the above described mechanism that whenever the pedal is depressed the lever 50 is drawn down to idle position and then at once springs back to active position. I provide a suitable spring, acting on the rod 38 of the shifter lever, to force the clutch pins into engagement whenever the lever 50 is drawn down, these pins bearing against the surface of the hub until the notches 18 come opposite them, whereupon they spring into the notches and rotation of the shaft results.

The spring for operating the shifter lever is indicated in Fig. 1 at 70. It is a leaf member suitably secured to the plate 10 and formed with a return arm to bear against the inner face of the shank 38, the spring having a depression 71 to engage this shank when the shank is vertical, as shown in Figs. 1 and 4. When the shank is tipped to the right to cause the automatic engagement heretofore described, it passes out of engagement with the spring 71, being then opposite the inclined portion 72. In this position the shank 38 engages a pin 75 on a lever 76 and swings it toward the right, which shoves downwardly on a link 77 connected at its lower end with the arm 50. Thus when the automatic engagement, above described is active the spring and the arm 50 are both out of action.

When the automatic mechanism is disengaged, as shown in Fig. 1, the spring is tending to engage the clutch, and the arm 50 is active to draw it out of engagement at the end of each rotation. In such withdrawing operation the pin 28, carried by the shiftable collar 25 and positioned to have substantially the lowest point when the clutch is to be disengaged, rides on the cam end of the lever 50 and forces the collar 25 away from the pulley hub, thus withdrawing the pins and disconnecting the pulley from the shaft.

It will be seen that my mechanism provides for the automatic control of the clutch and for the desired manual control by successively controlled rotations, and that the change from one to the other may be made in a very simple manner. To render the automatic control active the handle 39 is simply shoved rearwardly. To disconnect it and connect in the manual control, the handle is drawn forward, its shank engaging the pin 78 and restoring the lever 50 to controlling position; then the rotations are controlled by the foot pedal 52, each depression of which insures one rotation. The operator may make a practical continuous rotation by depressing the pedal again just before the completion of a rotation, and such may be the operation with a skilled operator, who is feeding paper, for instance, as fast as the machine can take care of it, but ordinarily there will be a slight rest between successive rotations on account of inability of the operator to supply the material as fast as the machine is geared to operate.

Having thus described my invention, I claim:

1. In a machine of the character described, the combination with a clutch, of a device for automatically throwing the clutch out of engagement and a separate manually controlled device for operating the clutch to throw it in and out periodically, there being a clutch lever operated by both devices and a manually shiftable extension member therefor which is movable transversely of the clutch lever to cause the latter to be operated by either one of said devices.

2. The combination with a rotary clutch and power shaft, of a device for automatically disengaging the clutch from the shaft and a separate manually operable device for periodically engaging and disengaging the clutch to produce a single rotation for each operation of the device, there being a clutch lever operated by either device and a member carried thereby, which when manually operated, will cause the lever to be operated by either one of said devices.

3. The combination with a clutch and a clutch lever, of two separate controlling mechanisms therefor, one of said mechanisms being automatic and serving when operated to act on the lever to cause it to disengage the clutch when the latter is rotating continuously, and the other mechanism being manual and operable to produce a succession of periodic rotations of the clutch separated by periods of rest, and a common means acting on both mechanisms for rendering one mechanism operable and rendering the other mechanism inoperable.

4. The combination with a rotary clutch and clutch lever, of a device arranged to automatically disengage the clutch independently of the number of revolutions thereof, a separate manually operated device operable to disengage the clutch after a predetermined rotary movement thereof and means carried by the clutch lever for selectively causing either one of said devices to operate the clutch.

5. The combination with a rotary clutch of a member for shifting said clutch, means for causing the shifting of said member at will to give a predetermined rotary movement to the clutch, additional means acting independently of the number of rotations of the clutch for automatically shifting it and means associated with said member for rendering one device ineffective while the other is operative.

6. The combination of a rotary clutch, a shipper lever for operating the same, an automatic device for throwing the clutch out of operation, a separate manually controlled device adapted to be arranged to operate the shipper lever at will to give the clutch a periodic rotary movement and means associated with the shipper lever whereby the automatic device may be disconnected from the lever and the manually controlled device conditioned for single rotation operation.

7. The combination of a rotary clutch, a shipper lever therefor, a movable operating member for the shipper lever and movable in a plane transverse to the axis of the clutch, an automatically actuated member, and means whereby movement of said first mentioned member couples the shipper lever with the automatically actuated member to operate the clutch upon actuation of said automatic member.

8. The combination of a rotary clutch, a shipper lever therefor, a movable extension member for the shipper lever, an automatically actuated member, a separate manually operating device for disengaging the clutch and acting independently of the automatically actuated member and means whereby movement of said extension member couples the shipper lever with the automatically actuated member and renders the manually operative device inoperative.

9. In a mechanism of the character described, the combination with a clutch, of an automatic device adapted to be coupled with the clutch for throwing the latter out of engagement, a separate manual device adapted to actuate the clutch at the end of a predetermined movement, and means whereby the coupling of the automatic device automatically disengages the manual device.

10. The combination of a rotary clutch, a shipper lever therefor, an automatically actuated member, means for coupling the shipper lever therewith, a manually operated device for disengaging the clutch, and means connecting the coupling means with the manual device whereby the engagement of the coupling means disconnects the manual device.

11. The combination with a clutch, of a shipper lever for shifting the same out of engagement, means for coupling the shipper lever with an automatic device, a movable arm normally in position to disengage the clutch, manual means for temporarily removing the arm from active position, said means for coupling the shipper lever with the automatic device serving to simultaneously remove said arm from active position.

12. The combination of two members adapted to be clutched together, of a shipper lever for moving one of them into engaging position, a member pivoted to the shipper lever on an axis transverse to the pivot thereof, and an automatically operated bar into engagement with which said member may be brought by movement about its own pivot.

13. The combination with a clutch, of a shipper lever therefor, means to automatically actuate the same, a spring acting on the lever and tending to hold the clutch engaged, an arm adapted to cause disengagement of the clutch, a spring for holding said arm in its active position, a manually operated trigger mechanism adapted to withdraw the arm and allow its return before the clutch has made a single rotation, and means whereby the act of moving the lever to active position with said automatic means, disengages the said arm from the trigger mechanism.

14. The combination with two members to be clutched including a loose rotary pulley, of a shiftable collar having pins slidable into and out of engagement with the pulley, a shifting means therefor, a cam arm adapted to cause movement of said collar into a position to withdraw the pins, manually operative means for controlling the position of said arm, a separate automatically operative means for independently controlling the clutch by acting on said shifting means and means for connecting the automatically operative means to the shifting means and for maintaining said arm in an inoperative position.

15. The combination with two members to be clutched, including a loose rotary pulley and a shiftable collar having pins slidable into and out of engagement with the pulley, of a shifting means therefor, a cam arm adapted to cause movement of said collar into position to withdraw the pins, a spring tending to move said arm into active position, a trigger device operable to withdraw the arm and to allow its return under spring action, a separate automatic means for operating the clutch by acting on said shifting means and means for connecting the automatic means to the shifting means to render the clutch automatically operable, said means also being operated to maintain said arm in an inactive position.

16. The combination of a clutch, a cam arm adapted to be engaged thereby to cause the clutch to pull itself out of engagement, a spring tending to hold the arm in its active position, a foot pedal, mechanism operated thereby adapted to move the arm into inactive position, means whereby said mechanism becomes automatically disengaged so that the arm may return to its clutch engaging position independently of the return of the foot pedal, a separate automatic means for operating the clutch and means for connecting said automatic means operatively to the clutch and for rendering said arm inactive.

17. The combination of a clutch, a cam arm adapted to be engaged thereby to cause the clutch to pull itself out of engagement, a spring tending to hold the arm in its active position, mechanism adapted to move the arm into inactive position and become automatically disengaged so that the arm may return under its spring action independently of said mechanism, a hand lever for throwing the clutch independently of the said arm, and mechanism controlled by the hand lever for connecting an automatic disengager with the clutch and disconnecting said arm.

In testimony whereof, I hereunto affix my signature.

CLIFTON CHISHOLM.